(12) United States Patent
Phillips et al.

(10) Patent No.: US 11,328,157 B2
(45) Date of Patent: May 10, 2022

(54) 360-DEGREE VIDEO FOR LARGE SCALE NAVIGATION WITH 3D IN INTERACTABLE MODELS

(71) Applicant: Honeywell International Inc., Morris Plains, NJ (US)

(72) Inventors: Mark Phillips, Gig Harbor, WA (US); Ziad Kaakani, Scottsdale, AZ (US); Jason Urso, Fountain Hills, AZ (US)

(73) Assignee: Honeywell International Inc., Charlotte, NC (US)

( * ) Notice: Subject to any disclaimer, the term of this patent is extended or adjusted under 35 U.S.C. 154(b) by 158 days.

(21) Appl. No.: 16/779,444

(22) Filed: Jan. 31, 2020

(65) Prior Publication Data
US 2021/0240985 A1 Aug. 5, 2021

(51) Int. Cl.
| | |
|---|---|
| *G06K 9/00* | (2006.01) |
| *G06F 3/0481* | (2013.01) |
| *G06K 9/32* | (2006.01) |
| *G06T 19/00* | (2011.01) |
| *G06F 3/04815* | (2022.01) |

(52) U.S. Cl.
CPC ..... *G06K 9/00671* (2013.01); *G06F 3/04815* (2013.01); *G06K 9/00718* (2013.01); *G06K 9/3241* (2013.01); *G06T 19/006* (2013.01)

(58) Field of Classification Search
None
See application file for complete search history.

(56) References Cited

U.S. PATENT DOCUMENTS

| | | | | |
|---|---|---|---|---|
| 7,990,394 B2* | 8/2011 | Vincent | ............... | G06F 3/04817 345/629 |
| 8,570,329 B1* | 10/2013 | Ofstad | ............... | G06T 13/20 345/473 |
| 8,767,040 B2* | 7/2014 | Jones | ............... | H04N 5/23238 348/36 |
| 9,036,000 B1* | 5/2015 | Ogale | ............... | G06T 3/4038 348/36 |
| 9,053,566 B1* | 6/2015 | Riggs | ............... | G06T 11/00 |

(Continued)

OTHER PUBLICATIONS

Michael Nebeling & Maximilian Speicher, "The Trouble with Augmented Reality/Virtual Reality Authoring Tools", University of Michigan School of Information, Published in 2018 IEEE International Symposium on Mixed and Augmented Reality Adjunct (ISMAR-Adjunct), Date of Conference: Oct. 16-20, 2018, IEEE.

*Primary Examiner* — David H Chu
(74) *Attorney, Agent, or Firm* — Ortiz & Lopez, PLLC; Kermit D. Lopez; Luis M. Ortiz

(57) ABSTRACT

A method and system for authoring a three-dimensional (3D) presentation can involve dividing a scene into a grid of equals-sized segments or non-equally sized segments, wherein one or more 360-degree cameras record the scene from a center of each segment, and a size of the each segment is proportional to a complexity of an environment captured in the scene. One or more objects can be created within the scene for a user interaction with a 3D presentation of the scene in the context of a video stream. A logical center of the object(s) can be used as a center point for recording a 360-degree video by the one or more 360-degree cameras for use as a low fidelity background video when the user interacts with the 3D presentation of the scene. The 3D presentation can be based on a 3D model.

20 Claims, 5 Drawing Sheets

(56) References Cited

U.S. PATENT DOCUMENTS

| | | | |
|---|---|---|---|
| 9,372,094 B2* | 6/2016 | Kankainen | H04N 5/23216 |
| 10,032,306 B2* | 7/2018 | Oh | G06T 3/0012 |
| 10,388,075 B2 | 8/2019 | Schmirler et al. | |
| 11,099,722 B2* | 8/2021 | Byrod | G06F 3/04842 |
| 2007/0273758 A1* | 11/2007 | Mendoza | G06F 3/04815 |
| | | | 348/39 |
| 2009/0225001 A1* | 9/2009 | Biocca | G02B 27/0172 |
| | | | 345/8 |
| 2011/0254915 A1* | 10/2011 | Vincent | G06T 17/05 |
| | | | 348/36 |
| 2012/0127281 A1 | 5/2012 | Ward et al. | |
| 2014/0160119 A1* | 6/2014 | Vincent | G06T 19/00 |
| | | | 345/419 |
| 2014/0321771 A1* | 10/2014 | Reinisch | G06T 3/4038 |
| | | | 382/284 |
| 2015/0325047 A1 | 11/2015 | Conner et al. | |
| 2016/0110919 A1 | 4/2016 | Hancock et al. | |
| 2016/0345003 A1 | 11/2016 | Ward et al. | |
| 2017/0169142 A1 | 6/2017 | Van der Velden | |
| 2018/0323972 A1* | 11/2018 | Reed | G02B 27/017 |
| 2018/0338128 A1* | 11/2018 | Trevor | H04N 5/23219 |
| 2019/0236842 A1 | 8/2019 | Bennett et al. | |
| 2019/0373015 A1 | 12/2019 | Kozloski et al. | |
| 2020/0059694 A1* | 2/2020 | Ju | H04N 21/4728 |
| 2020/0312029 A1* | 10/2020 | Heinen | G06T 15/04 |

\* cited by examiner

360-DEGREE VIDEO FOR LARGE SCALE NAVIGATION WITH 3D IN INTERACTABLE MODELS

TECHNICAL FIELD

Embodiments are generally related to industrial automation systems, and more particularly, to the visualization of industrial data. Embodiments further relate to the field of authoring AR (Augmented Reality) and VR (Virtual Reality) applications. Embodiments further relate to paid authoring three-dimensional ("3D") presentations.

BACKGROUND

Generally, augmented and virtual reality technologies allow users to experience content in 3D using some kind of display (e.g., in a head-mounted or hand-held device) capable of presenting virtual 3D environments from different perspectives. For example, a head-mounted or hand-held display might present a 3D scene from a perspective that changes depending on the orientation of the display. Augmented reality systems can combine real and virtual objects to allow the two to interact. For example, augmented reality systems can layer digital content on top of real world content appearing in the display. Some augmented reality systems utilize a headset that allows a user to view the real world through a transparent optical component (such as a lens) while 3D virtual images are projected and reflected toward the user's eye, effectively overlaying the 3D virtual images on top of what the user sees in the real world. A 3D environment can be generated that includes a 3D model of the real world and 3D assets representing virtual objects. As such, the 3D environment can be used to manage the relationship between the 3D assets and the real world, and the 3D assets can be used to project 3D virtual images that appear to interact with the real world.

Conventional AR or VR applications (referred to collectively herein as "VR/AR applications") can be accessed by a user via a wearable computer or other client device. Such AR/VR applications can generate and provide 3D presentations such as VR/AR presentations that can include three-dimensional (3D) holographic views of a plant facility or a location within a plant facility (e.g., a work area, a production line, etc.). The holographic views can be delivered to a wearable visualization computer, which renders the 3D view as a function of the user's current location and/or orientation. A VR/AR application can render a scaled down view of the factory floor area, which affords the user an external overview of the area. This external view may include real-time avatars representing human operators, superimposed production statistics and status data, and other information.

When authoring AR/VR applications that require users to navigate around, and interact with, extremely large-scale scenes, it is very difficult and time consuming to author these applications. Most solutions either completely create all the objects within the scene as 3D models, which is very time consuming and costly, or leverage 360-degree pictures for navigating around the scene, which is quick but has limited interactions, usually restricted to primitive two-dimensional ("2D") overlays.

What is needed is a solution that provides the rapid authoring and low cost of 360-degree pictures/videos but also includes the interaction and fidelity of 3D models. This is important for rapid development of 3D modeling of large scale and objects rich scenes like modeling an entire industrial plant.

BRIEF SUMMARY

The following summary is provided to facilitate an understanding of some of the features of the disclosed embodiments and is not intended to be a full description. A full appreciation of the various aspects of the embodiments disclosed herein can be gained by taking the specification, claims, drawings, and abstract as a whole.

It is, therefore, one aspect of the disclosed embodiments to provide for improved industrial automation systems and the improved visualization of industrial data.

It is another aspect of the disclosed embodiments to provide for an improved method and system for authoring AR and VR applications.

It is another aspect of the disclosed embodiments to provide for an improved method and system for authoring 3D presentations.

The aforementioned aspects and other objectives can now be achieved as described herein. In an embodiment, a method of authoring a three-dimensional (3D) presentation, can include dividing a scene into a grid of segments (equal-sized segments or non-equally sized segments), wherein at least one 360-degree camera records the scene from a center of each segment among the segments, wherein a size of the each segment is proportional to a complexity of an environment captured in the scene; creating at least one object within the scene for a user interaction with a 3D presentation of the scene in a context of a video stream; and using a logical center of the at least one object as a center point for recording a 360-degree video by the at least one 360-degree camera for use as a low fidelity background video when the user interacts with the 3D presentation of the scene, wherein the 3D presentation can be based on a 3D model.

In an embodiment of the method, the scene can comprise a large-scale scene.

In an embodiment of the method, the at least one 360-degree video can comprise at least one visual cue.

An embodiment of the method can further involve navigating between a plurality of hotspots in the 3D presentation using a teleporting method that translates a position of a user from a current hotspot among the plurality of hotspots and provides a motion blur as the video stream is transitioned to a new hotspot among the plurality of hotspots, which can become the new position of the user.

In an embodiment of the method, each hotspot among the plurality of hotspots can comprise a position of the at least one 360-degree camera.

An embodiment of the method can further involve overlaying an asset at the new hotspot and in front of an image of the at least one object.

An embodiment of the method can further involve: if the user interacts with the asset, fading out the 360-degree video and replacing the 360-degree video with the low fidelity background video, which is associated with the at least one object; simultaneously constructing the 3D model of the at least one object in the low fidelity background video; fading into a position that the at least one object had occupied in the 360-degree video; and allowing the user to interact with the 3D model of the at least one object, including allowing the user to freely move within the each segment and around the 3D model.

An embodiment of the method can further involve: after the user has completed an interaction with the 3D model, returning the user to an original hotspot among the hotspots from which the user started when interacting with the 3D model; allowing the user to interact with a graphically displayed button at the original position that takes the user back to the 360-degree video; fading out the low fidelity background video and the 3D model from the scene; and deleting the 3D model and fading a high-fidelity 360-degree video into a view of the user.

An embodiment of the method can further involve allowing the aforementioned non-equally sized segments to be stitched together.

In an embodiment, a system of authoring a three-dimensional (3D) presentation, can include at least one processor; and a non-transitory computer-usable medium embodying computer program code, the computer-usable medium capable of communicating with the at least one processor. The computer program code can include instructions executable by the at least one processor and configured for: dividing a scene into a grid of segments, wherein at least one 360-degree camera records the scene from a center of each segment among the segments, wherein a size of the each segment is proportional to a complexity of an environment captured in the scene; creating at least one object within the scene for a user interaction with a 3D presentation of the scene in a context of a video stream; and using a logical center of the at least one object as a center point for recording a 360-degree video by the at least one 360-degree camera for use as a low fidelity background video when the user interacts with the 3D presentation of the scene, wherein the 3D presentation can be based on a 3D model.

In an embodiment of the system, the scene can comprise a large-scale scene.

In an embodiment of the system, the at least one 360-degree video can comprise at least one visual cue.

In an embodiment of the system, the instructions can be further configured for navigating between a plurality of hotspots in the 3D presentation using a teleporting method that translates a position of a user from a current hotspot among the plurality of hotspots and provides a motion blur as the video stream is transitioned to a new hotspot among the plurality of hotspots, which can become the new position of the user.

In an embodiment of the system, each hotspot among the plurality of hotspots can comprise a position of the at least one 360-degree camera.

In an embodiment of the system, the instructions can be further configured for overlaying an asset at the new hotspot and in front of an image of the at least one object.

In an embodiment of the system, the instructions can be further configured for: if the user interacts with the asset, fading out the 360-degree video and replacing the 360-degree video with the low fidelity background video, which is associated with the at least one object; simultaneously constructing the 3D model of the at least one object in the low fidelity background video; fading into a position that the at least one object had occupied in the 360-degree video; and allowing the user to interact with the 3D model of the at least one object, including allowing the user to freely move within the each segment and around the 3D model.

In an embodiment of the system, the instructions can be further configured for: after the user has completed an interaction with the 3D model, returning the user to an original hotspot among the hotspots from which the user started when interacting with the 3D model; allowing the user to interact with a graphically displayed button at the original position that takes the user back to the 360-degree video; fading out the low fidelity background video and the 3D model from the scene; and deleting the 3D model and fading a high-fidelity 360-degree video into a view of the user.

In an embodiment of the system, the aforementioned segments can comprise equal-sized segments or non-equally sized segments.

In another embodiment, a system for authoring a three-dimensional (3D) presentation, can include: at least one 360-degree camera that records a scene that is divided into a grid of equal-sized segments, wherein the at least one 360-degree camera records the scene from a center of each segment among the equal-sized segments, and a size of the each segment is proportional to a complexity of an environment captured in the scene; a 3D presentation, wherein at least one object can be created within the scene for a user interaction with the 3D presentation of the scene in a context of a video stream; and wherein a logical center of the at least one object is used as a center point for recording a 360-degree video by the at least one 360-degree camera for use as a low fidelity background video when the user interacts with the 3D presentation of the scene, wherein the 3D presentation can be based on a 3D model.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other issues, subject matter may be embodied as methods, devices, components, or systems. Accordingly, embodiments may, for example, take the form of hardware, software, firmware, or a combination thereof. The following detailed description is, therefore, not intended to be interpreted in a limiting sense.

Throughout the specification and claims, terms may have nuanced meanings suggested or implied in context beyond an explicitly stated meaning. Likewise, phrases such as "in one embodiment" or "in an example embodiment" and variations thereof as utilized herein may not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Generally, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a," "an," or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Figure 1:
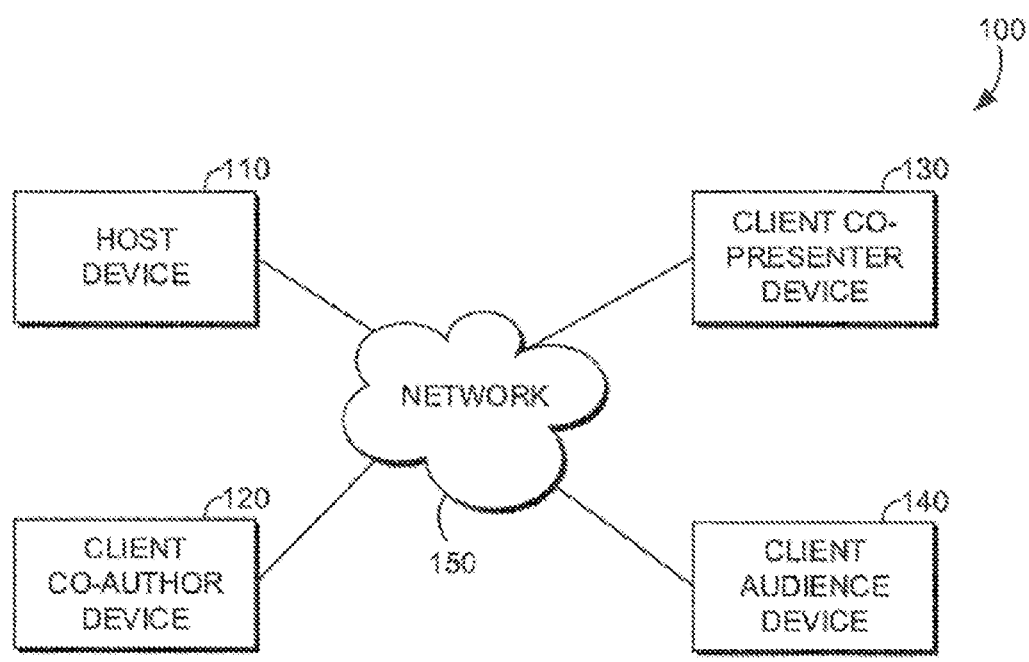
FIG. 1 illustrates a block diagram of an exemplary 3D presentation system for use in authoring and delivering 3D presentations, in accordance with embodiments described herein.

Referring now to FIG. 1, a block diagram of a 3D presentation system 100 suitable for use in implementing embodiments is illustrated. Generally, the 3D presentation system 100 can be suitable for augmented reality and/or virtual reality, and, among other features, can facilitate authoring and delivering 3D presentations. The 3D presentation system 100 can include a host device (e.g., a host device 110) and one or more client devices (e.g., a client co-author device 120, a client co-presenter device 130, a client audience device 140). Generally, each host and client device is capable of composing augmented reality images comprising a real-world scene with one or more virtual images superimposed on top. For example, the host and client devices can be any kind of computing device capable of facilitating augmented reality and/or virtual such as the computing device 1700 of FIG. 2.

More specifically, the host and client devices can be a head-mounted display (e.g., a VR or AR headset), a personal computer (PC), a laptop computer, a workstation, a mobile computing device, a PDA, a cell phone, a combination thereof, or the like. In an embodiment, at least one host or client device can be an AR headset or a VR headset such as a head-mounted display. Although embodiments below are described with reference to multiple AR and/or VR headsets, any combination of devices is possible.

Generally, the components of the 3D presentation system 100 can communicate with each other via, network 150, which may include, without limitation, any wired and/or wireless protocol (e.g., HDMI, USB, WiFi, Bluetooth, etc.). Additionally and/or alternatively, network 150 may include one or more local area networks (LANs) and/or wide area networks (WANs). Such networking environments are commonplace in offices, enterprise-wide computer networks, intranets, and the Internet. Although the components of the 3D presentation system 100 are described in the context of a host-client configuration, other variations of communication techniques and configurations will be understood by those of ordinary skill in the art, and may be implemented within the present disclosure.

Figure 2:
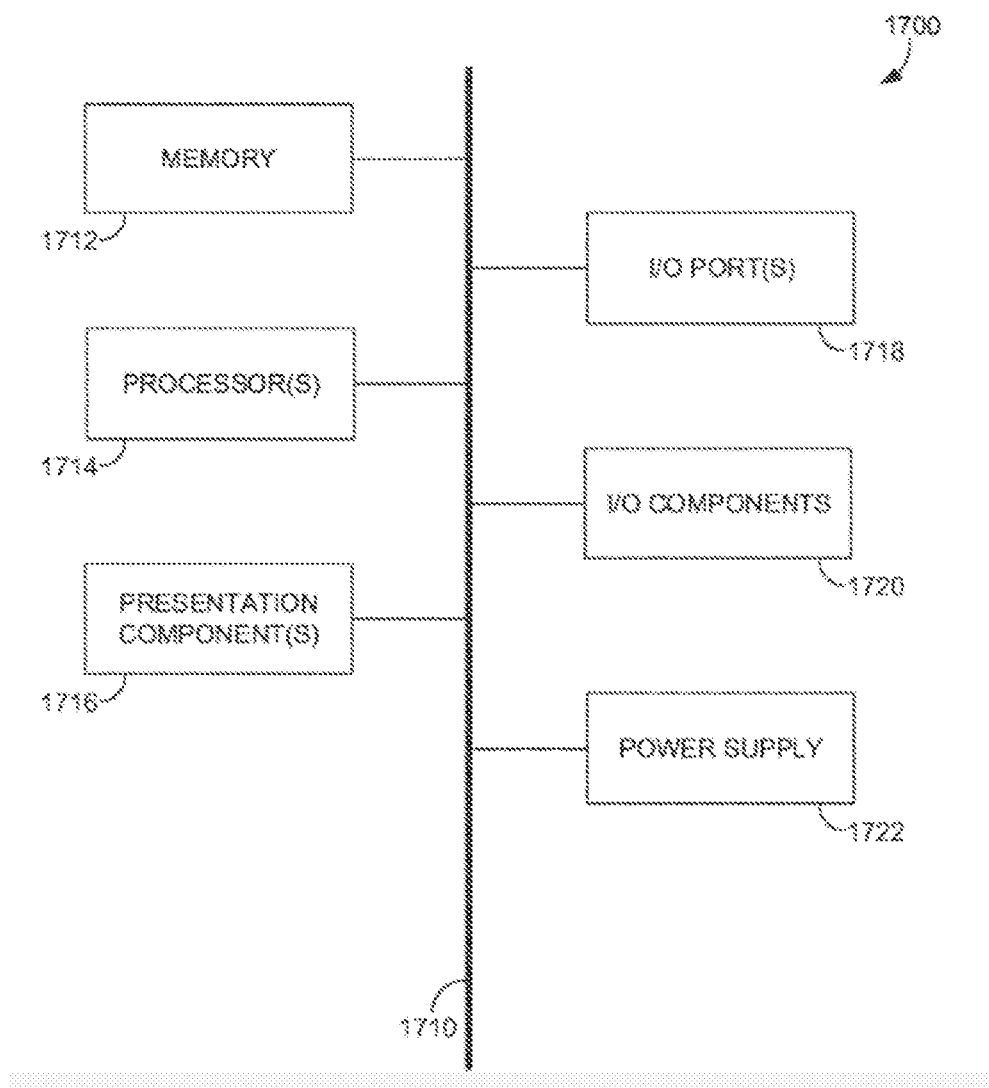
FIG. 2 illustrates a block diagram of an exemplary computing device suitable for use in implementing an embodiment.

Referring to FIG. 2, an exemplary operating environment for implementing an embodiment is shown and designated generally as computing device 1700. Computing device 1700 is but one example of a suitable computing environment and is not intended to suggest any limitation as to the scope of use or functionality of the invention. Neither should computing device 1700 be interpreted as having any dependency or requirement relating to any one or combination of components illustrated.

The embodiments may be described in the general context of computer code or machine-useable instructions, including computer-executable instructions such as program modules, being executed by a computer or other machine, such as a, personal data assistant or other handheld device. Generally, program modules including routines, programs, objects, components, data structures, etc. refer to code that perform particular tasks or implement particular abstract data types. Embodiments may be practiced in a variety of system configurations, including hand-held devices, consumer electronics, general-purpose computers, more specialty computing devices, etc. Embodiments may also be practiced in distributed computing environments where tasks are performed by remote-processing devices that are linked through a communications network.

With reference to FIG. 2, the computing device 1700 can include a bus 1710 that directly or indirectly couples the following devices: memory 1712, one or more processors 1714, one or more presentation components 1716, input/output ports 1718, input/output components 1720, and illustrative power supply 1722. The bus 1710 represents what may be one or more buses (such as an address bus, data bus, or combination thereof). The various blocks of FIG. 2 are depicted with lines for the sake of conceptual clarity, and other arrangements of the described components and/or component functionality are also contemplated. For example, one may consider a presentation component such as a display device to be an I/O component. Also, processors have memory. We recognize that such is the nature of the art, and reiterate that the diagram of FIG. 2 is merely illustrative of an exemplary computing device that can be used in connection with one or more embodiments. Distinction is not made between such categories as "workstation," "server," "laptop," "hand-held device," etc., as all are contemplated within the scope of FIG. 2 and reference to "computing device."

Computing device 1700 typically includes a variety of computer-readable media. Computer-readable media can be any available media that can be accessed by computing device 1700 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1700. Computer storage media excludes signals per se.

Communication media typically embodies computer-readable instructions, data, structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1712 includes computer storage media, in the form of volatile and/or nonvolatile memory. The memory may be removable, non-removable, or a combination thereof. Exemplary hardware devices include solid-state memory, hard drives, optical-disc drives, etc. Computing device 1700 includes one or more processors that read data from various entities such as memory 1712 or I/O components 1720. Presentation component(s) 1716 present data indications to a user or other device. Exemplary presentation components include a display device, speaker, printing component, vibrating component, etc.

I/O ports 1718 allow computing device 1700 to be logically coupled to other devices including I/O components 1720, some of which may be built in. Illustrative components include a microphone, joystick, game pad, satellite dish, scanner, printer, wireless device, etc.

With reference to the 3D presentation system 100, embodiments described herein can support authoring and presenting 3D presentations in augmented reality and/or virtual reality. The 3D presentation system components refer to integrated components for authoring and presenting in augmented reality. The integrated components refer to the hardware architecture and software framework that support functionality within the system. The hardware architecture refers to physical components and interrelationships thereof and the software framework refers to software providing functionality that can be implemented with hardware embodied on a device.

The end-to-end software-based system can operate within the system components to operate computer hardware to provide system functionality. At a low level, hardware processors execute instructions selected from a machine language (also referred to as machine code or native) instruction set for a given processor. The processor recognizes the native instructions and performs corresponding low-level functions relating, for example, to logic, control and memory operations. Low-level software written in machine code can provide more complex functionality to higher levels of software. As used herein, computer-executable instructions includes any software, including low-level software written in machine code, higher level software such as application software and any combination thereof. In this regard, the system components can manage resources and provide services for system functionality. Any other variations and combinations thereof are contemplated with embodiments. Note that such computer-executable instructions can include instructions for implementing steps or operations such as the steps or operations illustrated and described herein with respect to the various blocks shown in FIG. 3, FIG. 4, FIG. 5, and FIG. 6.

By way of example, the 3D presentation system 100 can include an API library that can include specifications for routines, sub-routines, data structures, object classes, and variables, which may support the interaction between the hardware architecture of the device and the software framework of the 3D presentation system 100. These APIs can include configuration specifications for the 3D presentation system 100 such that the different components therein can communicate with one another in the 3D presentation system 100, as described herein.

As will be discussed, the disclosed embodiments can provide a solution involving the rapid authoring and low cost production of 360-degree pictures/videos, and can also involve the interaction and fidelity of 3D models. This solution can be used for the rapid development of 3D modeling of large scale and object-rich scenes in applications such as, for example, modeling an entire industrial plant or facility.

The disclosed approach can include rapidly authoring extremely large-scale scenes using 360-degree videos with hotspots (e.g., transport points) for navigation around the scene. This approach can also include interaction hotspots for transitioning to 3D models of objects that the user can then interact with. When a user has finished interacting with the 3D models, the user can be transitioned back into the 360-degree video and can continue navigating around the scene. In the scene, the user can be provided with visual cues that indicate where 3D immersive models jump-points are located. Within the 360 video, the user can view and navigate the scene and observe the surrounding, which can contain informational cues. When transported to a rich immersive model hotspot, the user will be able to have interactive capabilities with the model presented.

The large-scale scene can be broken up into a grid of equal sized segments, and 360-degree cameras can be used to record the scene from the center of each segment (i.e., high fidelity). The size of the segments can be proportional to the complexity of the environment. More detail may require smaller segments, and less detail can use larger segment sizes.

Objects within the scene that may be needed to provide user interaction can be created as 3D rich and immersive models. Note that navigating the 3D model of an object is inclusive of a deep dive (immersive) into the object seeing its internal construction, allows decomposing the object, seeing critical parameters that the object represents, configure the object, troubleshoot the object, etc. Basically, the 3D model can be an object that a user can interact with and deep dive into its construction or its functionality. This can be used as a learning mechanism of what the 3D model object represents. The logical center of each object can be used as a center point for recording a 360-degree video that can be then used as the low fidelity (low LOD) background when the user interacts with this 3D model.

The 360 videos can also contain visual cues. A user can navigate between hotspots (i.e., a position of each 360-degree camera) using a teleport type method that can rapidly translate the user's position, from the current hotspot, thereby providing a small amount of motion blur as the video stream is transitioned to the new camera position and video feed, which can then become the user's new position. This teleporting method can provide advantages over allowing the user to freely navigate around the environment. Such advantages can include, for example, reduced motion sickness for the user, a limited need for interpolating video positions between hotspots during translation, and simplicity of implementation.

Since the entire scene can be mapped out, the position of each interactable object can be known in world space, as well as the optimal position (e.g., a hotspot) from which to allow the user to initiate the interaction with that object. At this hotspot, an additional interactive asset (e.g., a button or similar visual element) can be overlaid in front of the image of the object.

If the user interacts with this asset, the current 360-degree video can be faded out and replaced with the low fidelity background video associated with the object. At the same time, a 3D model of the object can be constructed in the background and then faded into the position that the object (or objects) had occupied in the original 360-degree video. Since the position of the original object, relative to the user's position (hotspot) may be known, the 3D model of the object can be placed into the world space in such a manner as to appear seamless from the user's perspective.

The user may now be able to interact with the 3D model of the object, including freely moving within the segment, as well as around the 3D model. When the user has completed the interaction with the 3D model, the user can return to the hotspot position they started at, when interacting with the 3D model.

From this position, the user can interact with a button that can take the user back to the 360-degree video. The low fidelity background 360-degree video and the 3D model can be faded out from the scene. The 3D model can be deleted and the high-fidelity 360-degree video can be faded back into the user's view and resumed.

The user can now navigate around the scene as before. The solution may not be limited to one user at a time. That is, the full scene navigation can support 1 to N number of users where such users can observe or interact with each other's avatars in the virtual space.

Figure 3:
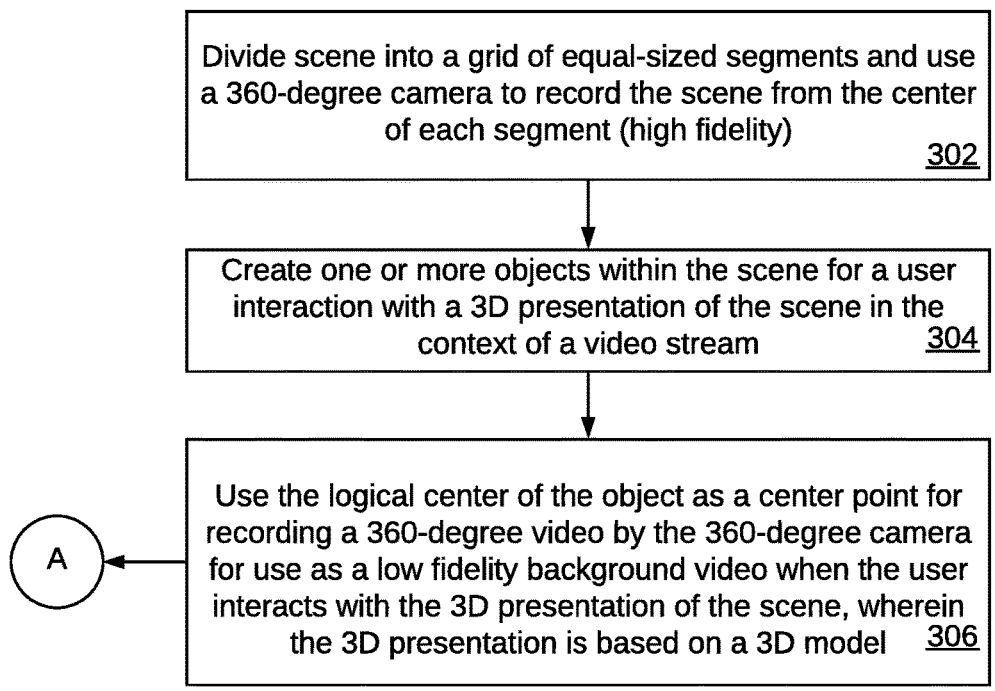
FIG. 3 illustrates logical operational steps of a method for authoring a 3D presentation involving dividing a grid of equal-sized segments, in accordance with an embodiment.

FIG. 3 illustrates logical operational steps of a method 300 for authoring a 3D presentation involving dividing a grid of equal-sized segments, in accordance with an embodiment. Note that the authored 3D presentation created as a result of implemented the various methods disclosed herein can be presented via a 3D presentation system such as the 3D presentation system 100 discussed earlier.

As depicted at block 302, a step or operation can be implemented in which a scene can be divided into a grid of equal-sized segments and a 360-degree camera used to record the scene from the center of each segment (i.e., high fidelity). Note that although a step of dividing a grid of equal sized segments, can be implemented, as discussed above, it can be appreciated that a more complex scene stitching algorithm can allow non-equally sized 3D video segments to be stitched together. Next, as described at block 304, a step or operation can be implemented in which one or more objects within the scene is created for user interaction with a 3D presentation of the scene in the context of a video stream. Note that the term "video stream" as utilized herein can relate to "video streaming," which is a type of media streaming in which the data from a video file is continuously delivered via the Internet to a remote user. Video stream can allow a video to be viewed online without being downloaded on a host computer or device.

As illustrated next at block 306, a step or operation can be implemented in which the logical center of the object can be used as a center point for recording a 360-degree video by the 360-degree camera for use as a low fidelity background video when the user interacts with the 3D presentation of the scene, and wherein the 3D presentation is based on a 3D model.

Figure 4:
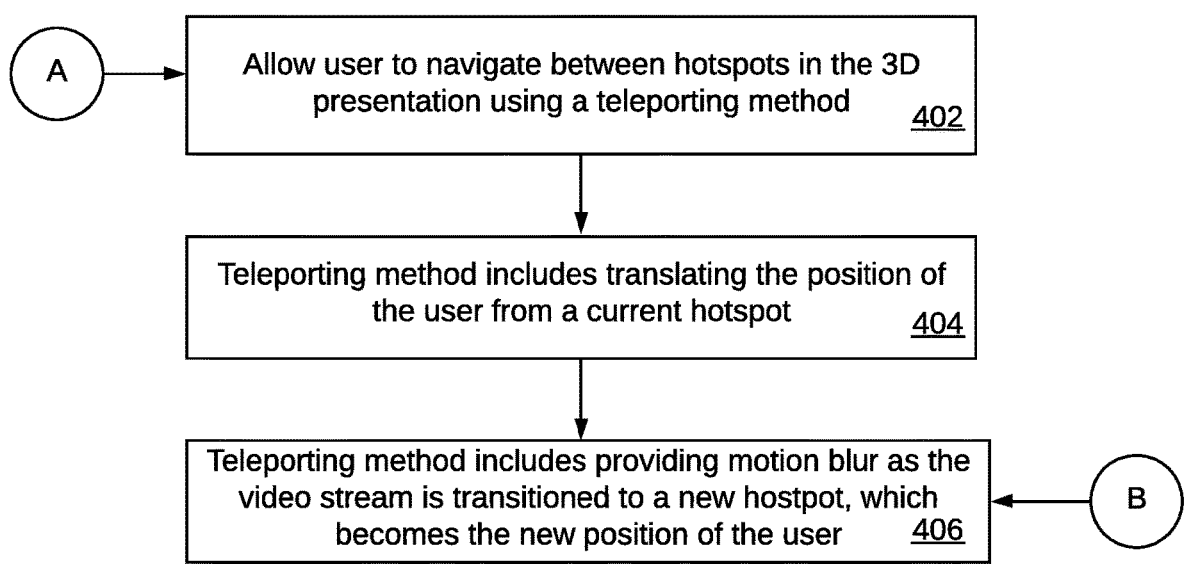
FIG. 4 illustrates logical operational steps of a method of a method for authoring a 3D presentation involving a teleporting technique, in accordance with an embodiment.

FIG. 4 illustrates logical operational steps of a method 400 for authoring a 3D presentation involving a teleporting technique, in accordance with an embodiment. The term "teleporting" or "teleport" as utilized herein can relate to the so-called "teleport effect", which may involve changing the orientation of a user with the virtual space of a VU (Virtual Universe). A VU can be implemented as a computer-implemented simulation intended for its users to traverse, inhabit, and interact through the use of avatars. Many VUs are represented using 3-D graphics and landscapes, and are populated by many thousands of users, known as "residents." VUs (virtual universes) are traversed by such methods as walking, flying, and teleporting.

A teleport can provide a mechanism to travel rapidly from one location in a VU to another location, even if the locations are geographically far apart. In typical virtual universes, an invitation for teleporting may be received that is an offer to transport the recipient from a recipient's current location to a second location. A user may reject or accept the offer for teleporting. If the user accepts the offer, for example by selecting the invitation presented as words on the VU GUI, the user's avatar is then transported from the current location to the second location. In practical terms, teleportation (and hence, "teleporting" and "teleport") can refer to the "re-rendering" of an avatar in a different environment. This re-rendering may occur on the same processor within the same simulation engine; it may occur on a different processor within the same simulation engine; on the same processor with a different simulation engine; or a different processor with a different simulation engine.

Note that the method 400 and its various steps and operations can be implemented following implementation of the method 300 depicted in FIG. 3. For example, the step or operation shown at block 402 can be implemented following implementation of the step or operation discussed above with respect to block 306.

As shown at block 402, a step or operation can be implemented to allow a user to navigate between hotspots in the 3D presentation using a teleporting method. Next, as shown at block 404, the teleporting method can include translating the position of the user from a current hotspot. As depicted next at block 406, the teleporting method can further involve providing motion blur as the video stream is transitioned to a new hotspot, which becomes the new position of the user. Note that the various methods 300, 400, 500 and 600 illustrated and described herein with respect to FIG. 3, FIG. 4, FIG. 5, and FIG. 6 can implemented as part of an overall method or process. For example, the method 400 may be implemented after method 300, and so on.

Figure 5:
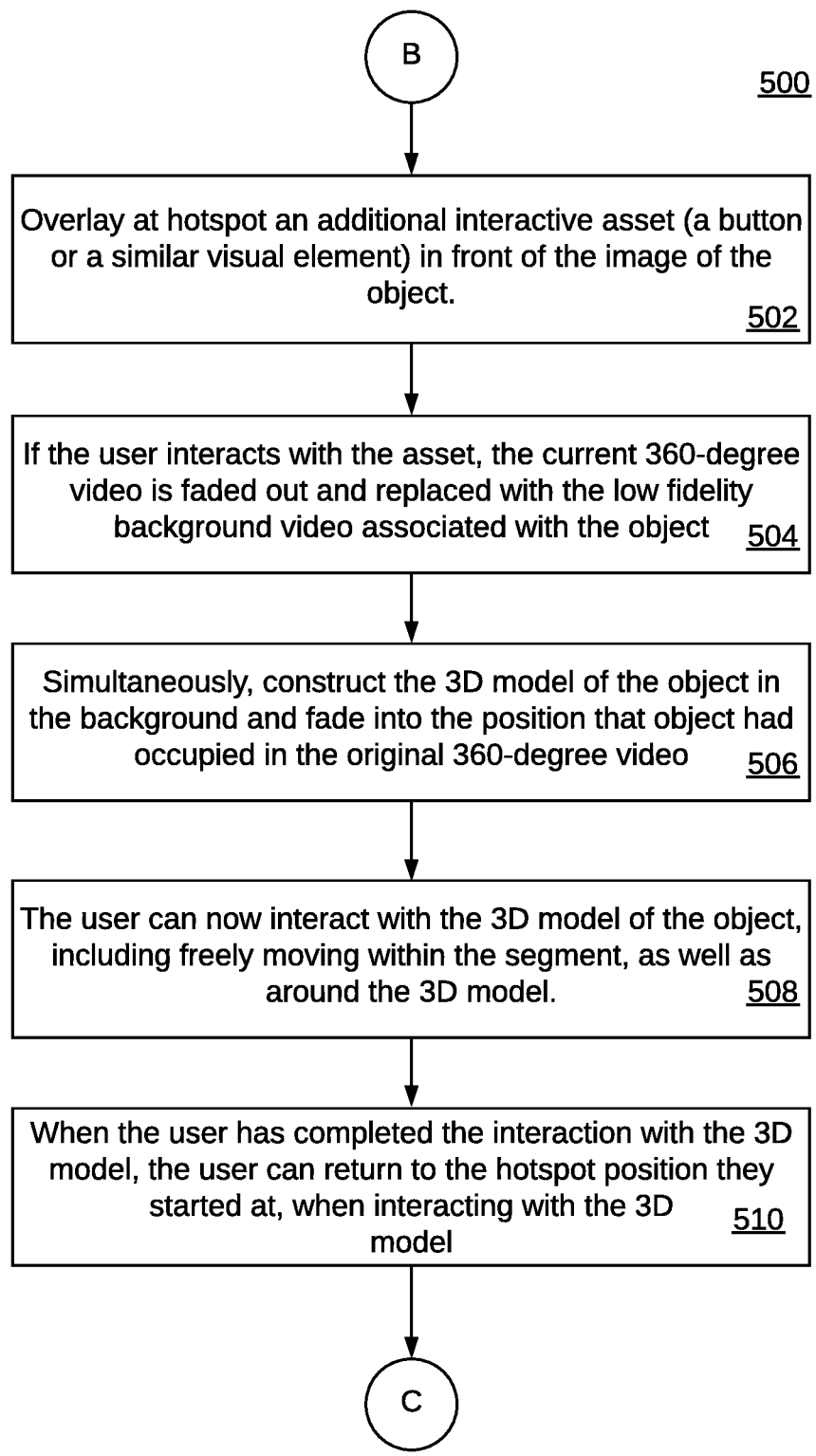
FIG. 5 illustrates logical operational steps of a method for authoring a 3D presentation involving an overlaying operation, in accordance with an embodiment.

FIG. 5 illustrates logical operational steps of a method 500 for authoring a 3D presentation involving an overlaying operation, in accordance with an embodiment. A shown at block 502, a step or operation can be implemented to overlay at a hotspot an additional interactive asset (e.g., a button or a similar visual element) in front of the image of the object. The step or operation depicted at block 502 in FIG. 5 can be implemented after implementation of the step or operation shown in block 406 of FIG. 4, as discussed above.

Next, as depicted at block 504, a step or operation can be implemented in which if the user interacts with the asset, the current 360-degree video can be faded out and replaced with the low fidelity background video associated with the object. Thereafter, as illustrated at block 506, a step or operation can be implemented to simultaneously, construct the 3D model of the object in the background and fade into the position that object had occupied in the original 360-degree video. Then, as shown at block 508, a step or operation can be implemented in which the user can now interact with the 3D model of the object, including freely moving within the segment, as well as around the 3D model. Regarding the operation depicted at block 508, as discussed previously, navigating the 3D model of an object is inclusive of a deep dive into the object seeing its internal construction, allows decomposing the object, seeing critical parameters that the object represents, configure the object, troubleshoot the object, etc. Basically, the 3D model is an object the user can interact with and deep dive into its construction or its functionality. This can be used as a learning mechanism of what the 3D model object represents. Next, as indicated at block 510, when the user has completed the interaction with the 3D model, the user can return to the hotspot position he or she started at, when interacting with the 3D model.

Figure 6:
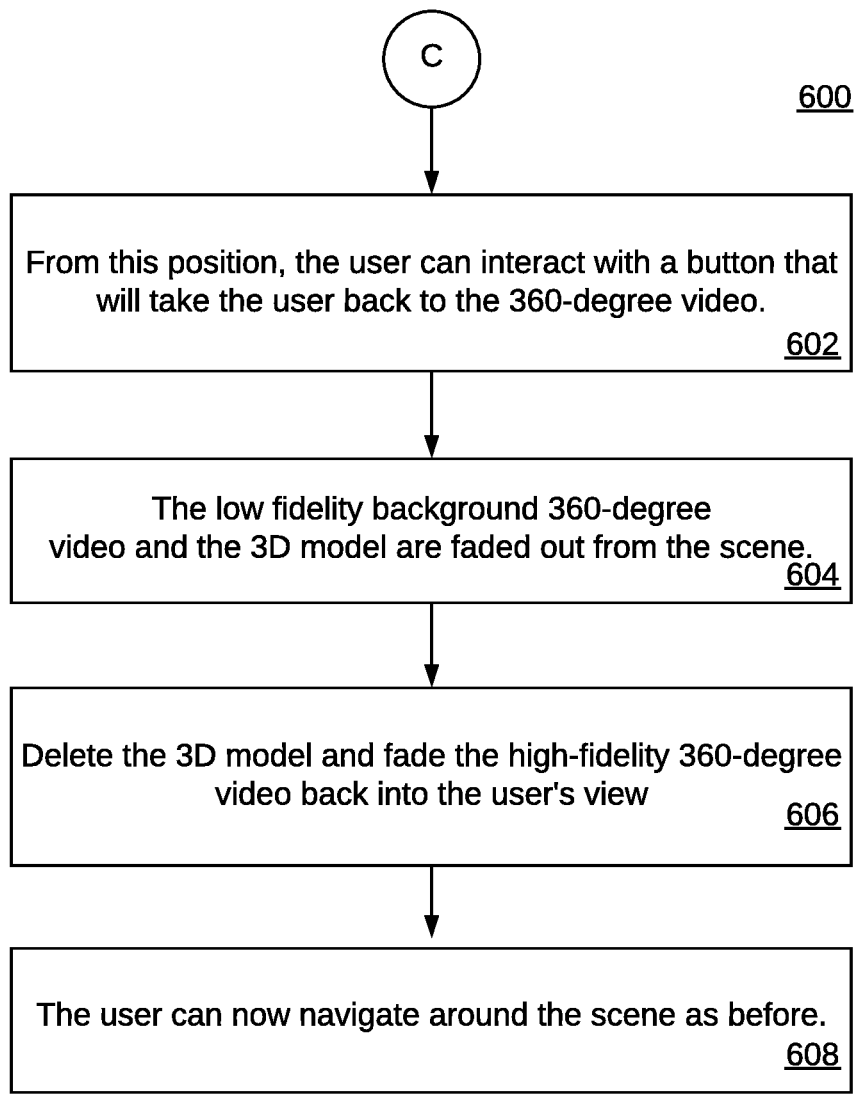
FIG. 6 illustrates logical operational steps of a method for authoring a 3D presentation involving a fading operation, in accordance with an embodiment.

FIG. 6 illustrates logical operational steps of a method 600 for authoring a 3D presentation involving a fading operation, in accordance with an embodiment. Method 600 can be implemented following implementation of method 500. For example, the operation shown at block 602 can be implemented after implementation of the step or operation shown at block 510 in FIG. 5. Thus, as shown at block 602, from this position, the user can interact with a button that will take the user back to the 360-degree video. Next, as depicted at block 604, a step or operation can be implemented in which the low fidelity background 360-degree video and the 3D model are faded out from the scene. Thereafter, as illustrated at block 606, a step or operation can be implemented to delete the 3D model and fade the high-fidelity 360-degree video back into the user's view. Next, as shown at block 608, a step or operation can be implemented in which the user can now navigate around the scene as before.

The disclosed example embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of, for example, a general-purpose computer, special-purpose computer, or other programmable data processing apparatus to produce a machine, such that the instructions, which execute via the processor of the computer or other programmable data processing apparatus, create means for implementing the functions/acts specified in the block or blocks.

To be clear, the disclosed embodiments can be implemented in the context of, for example a special-purpose computer or a general-purpose computer, or other programmable data processing apparatus or system. For example, in some example embodiments, a data processing apparatus or system can be implemented as a combination of a special-purpose computer and a general-purpose computer. In this regard, a system composed of different hardware and software modules and different types of AR and VR features may be considered a special-purpose computer designed with the specific purpose of rendering a visualization. In general, embodiments may be implemented as a method, and/or a computer program product at any possible technical detail level of integration. The computer program product may include a computer readable storage medium (or media) having computer readable program instructions thereon for causing a processor to carry out aspects of the embodiments.

The aforementioned computer program instructions may also be stored in a computer-readable memory that can direct a computer or other programmable data processing apparatus to function in a particular manner, such that the instructions (e.g., steps/operations) stored in the computer-readable memory produce an article of manufacture including instruction means which implement the function/act specified in the various block or blocks, flowcharts, and other architecture illustrated and described herein.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

The flow charts and block diagrams in the figures illustrate the architecture, functionality, and operation of possible implementations of systems, methods, and computer program products according to various embodiments (e.g., preferred or alternative embodiments). In this regard, each block in the flow chart or block diagrams may represent a module, segment, or portion of instructions, which comprises one or more executable instructions for implementing the specified logical function(s).

In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The functionalities described herein may be implemented entirely and non-abstractly as physical hardware, entirely as physical non-abstract software (including firmware, resident software, micro-code, etc.) or combining non-abstract software and hardware implementations that may all generally be referred to herein as a "circuit," "module," "engine", "component," "block", "database", "agent" or "system." Furthermore, aspects of the present disclosure may take the form of a computer program product embodied in one or more non-ephemeral computer readable media having computer readable and/or executable program code embodied thereon.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A method of authoring a three-dimensional (3D) presentation, comprising:
dividing a scene into a grid of segments, wherein at least one 360-degree camera records the scene from a center of each segment among the segments, wherein a size of the each segment is proportional to a complexity of an environment captured in the scene;

creating at least one object within the scene for a user interaction with a 3D presentation of the scene in a context of a video stream; and using a logical center of the at least one object as a center point for recording a 360-degree video by the at least one 360-degree camera for use as a low fidelity background video when the user interacts with the 3D presentation of the scene, wherein the 3D presentation is based on a 3D model.

2. The method of claim 1 wherein the scene comprises a large-scale scene.

3. The method of claim 1 wherein the at least one 360-degree video comprises at least one visual cue.

4. The method of claim 1 further comprising navigating between a plurality of hotspots in the 3D presentation using a teleporting method that translates a position of a user from a current hotspot among the plurality of hotspots and provides a motion blur as the video stream is transitioned to a new hotspot among the plurality of hotspots, which becomes a new position of the user.

5. The method of claim 4 wherein each hotspot among the plurality of hotspots comprises a position of the at least one 360-degree camera.

6. The method of claim 4 further comprising overlaying an asset at the new hotspot and in front of an image of the at least one object.

7. The method of claim 6 further comprising:
if the user interacts with the asset, fading out the 360-degree video and replacing the 360-degree video with the low fidelity background video, which is associated with the at least one object;
simultaneously constructing the 3D model of the at least one object in the low fidelity background video;
fading into a position that the at least one object had occupied in the 360-degree video; and
allowing the user to interact with the 3D model of the at least one object, including allowing the user to freely move within the each segment and around the 3D model.

8. The method of claim 4 further comprising:
after the user has completed an interaction with the 3D model, returning the user to an original hotspot among the hotspots from which the user started when interacting with the 3D model;
allowing the user to interact with a graphically displayed button at the original position that takes the user back to the 360-degree video;
fading out the low fidelity background video and the 3D model from the scene; and
deleting the 3D model and fading a high-fidelity 360-degree video into a view of the user.

9. The method of claim 1 wherein the segments comprise equal-sized segments or non-equally sized segments.

10. The method of claim 9 further comprising allowing the non-equally sized segments to be stitched together.

11. A system of authoring a three-dimensional (3D) presentation, comprising:
at least one processor; and
a non-transitory computer-usable medium embodying computer program code, the computer-usable medium capable of communicating with the at least one processor, the computer program code comprising instructions executable by the at least one processor and configured for:

dividing a scene into a grid of segments, wherein at least one 360-degree camera records the scene from a center of each segment among the segments, wherein a size of the each segment is proportional to a complexity of an environment captured in the scene;

creating at least one object within the scene for a user interaction with a 3D presentation of the scene in a context of a video stream; and using a logical center of the at least one object as a center point for recording a 360-degree video by the at least one 360-degree camera for use as a low fidelity background video when the user interacts with the 3D presentation of the scene, wherein the 3D presentation is based on a 3D model.

12. The system of claim 11 wherein the scene comprises a large-scale scene.

13. The method of claim 11 wherein the at least one 360-degree video comprises at least one visual cue.

14. The system of claim 11 wherein the instructions are further configured for navigating between a plurality of hotspots in the 3D presentation using a teleporting method that translates a position of a user from a current hotspot among the plurality of hotspots and provides a motion blur as the video stream is transitioned to a new hotspot among the plurality of hotspots, which becomes a new position of the user.

15. The system of claim 14 wherein each hotspot among the plurality of hotspots comprises a position of the at least one 360-degree camera.

16. The system of claim 14 wherein the instructions are further configured for overlaying an asset at the new hotspot and in front of an image of the at least one object.

17. The system of claim 16 wherein the instructions are further configured for:
if the user interacts with the asset, fading out the 360-degree video and replacing the 360-degree video with the low fidelity background video, which is associated with the at least one object;
simultaneously constructing the 3D model of the at least one object in the low fidelity background video;
fading into a position that the at least one object had occupied in the 360-degree video; and
allowing the user to interact with the 3D model of the at least one object, including allowing the user to freely move within the each segment and around the 3D model.

18. The system of claim 14 wherein the instructions are further configured for:
after the user has completed an interaction with the 3D model, returning the user to an original hotspot among the hotspots from which the user started when interacting with the 3D model;
allowing the user to interact with a graphically displayed button at the original position that takes the user back to the 360-degree video;
fading out the low fidelity background video and the 3D model from the scene; and
deleting the 3D model and fading a high-fidelity 360-degree video into a view of the user.

19. The system of claim 11 wherein the segments comprise equal-sized segments or non-equally sized segments.

20. A system for authoring a three-dimensional (3D) presentation, comprising:
at least one 360-degree camera that records a scene that is divided into a grid of equal-sized segments, wherein the at least one 360-degree camera records the scene from a center of each segment among the equal-sized segments, and a size of the each segment is proportional to a complexity of an environment captured in the scene;

a 3D presentation, wherein at least one object is created within the scene for a user interaction with the 3D presentation of the scene in a context of a video stream; and wherein a logical center of the at least one object is used as a center point for recording a 360-degree video by the at least one 360-degree camera for use as a low fidelity background video when the user interacts with the 3D presentation of the scene, wherein the 3D presentation is based on a 3D model.

* * * * *